(12) United States Patent
Li

(10) Patent No.: US 8,272,172 B2
(45) Date of Patent: Sep. 25, 2012

(54) MOUNTING DEVICE AND ROOF CONNECTION DEVICE USING THE SAME

(75) Inventor: Shao-Hui Li, Shenzhen (CN)

(73) Assignee: Du Pont Apollo Limited, Hong Kong (HK)

( * ) Notice: Subject to any disclaimer, the term of this patent is extended or adjusted under 35 U.S.C. 154(b) by 237 days.

(21) Appl. No.: 12/784,423

(22) Filed: May 20, 2010

(65) Prior Publication Data
US 2011/0247292 A1   Oct. 13, 2011

(30) Foreign Application Priority Data
Apr. 9, 2010   (CN) .......................... 2010 1 0146535

(51) Int. Cl.
*E04B 1/38* (2006.01)
(52) U.S. Cl. ................................ 52/24; 52/25; 248/237
(58) Field of Classification Search ............... 52/24, 25, 52/26, 173.3; 248/237
See application file for complete search history.

(56) References Cited

U.S. PATENT DOCUMENTS

| | | | | |
|---|---|---|---|---|
| 5,228,248 A * | 7/1993 | Haddock | ........................... | 52/25 |
| 5,483,772 A * | 1/1996 | Haddock | ........................... | 52/25 |
| 5,596,858 A * | 1/1997 | Jordan | ........................... | 52/460 |
| 5,694,721 A * | 12/1997 | Haddock | ........................... | 52/24 |
| 5,715,640 A * | 2/1998 | Haddock | ........................... | 52/545 |
| 5,732,513 A * | 3/1998 | Alley | ........................... | 52/25 |
| 5,983,588 A * | 11/1999 | Haddock | ........................... | 52/545 |
| 6,164,033 A * | 12/2000 | Haddock | ........................... | 52/545 |
| 6,223,477 B1 * | 5/2001 | Alley | ........................... | 52/24 |
| 6,688,047 B1 * | 2/2004 | McNichol | ........................... | 52/25 |
| 6,718,718 B2 * | 4/2004 | Haddock | ........................... | 52/545 |
| 6,834,466 B2 * | 12/2004 | Trevorrow et al. | ........................... | 52/24 |
| 7,013,612 B2 * | 3/2006 | Haddock | ........................... | 52/545 |
| 7,100,338 B2 * | 9/2006 | Haddock | ........................... | 52/545 |
| 7,513,080 B1 * | 4/2009 | Showalter | ........................... | 52/24 |
| 7,549,253 B2 * | 6/2009 | Hockman | ........................... | 52/25 |
| 7,703,256 B2 * | 4/2010 | Haddock | ........................... | 52/543 |
| 7,758,011 B2 * | 7/2010 | Haddock | ........................... | 248/500 |
| 8,070,119 B2 * | 12/2011 | Taylor | ........................... | 248/237 |
| 2002/0088196 A1 * | 7/2002 | Haddock | ........................... | 52/543 |
| 2005/0108952 A1 * | 5/2005 | Trevorrow et al. | ........................... | 52/25 |
| 2007/0051053 A1 * | 3/2007 | Hockman | ........................... | 52/25 |
| 2010/0171016 A1 * | 7/2010 | Haddock | ........................... | 248/237 |
| 2010/0284737 A1 * | 11/2010 | McPheeters | ........................... | 403/374.3 |
| 2011/0232212 A1 * | 9/2011 | Pierson et al. | ........................... | 52/173.3 |

FOREIGN PATENT DOCUMENTS

CN    200974081 Y    11/2007

\* cited by examiner

*Primary Examiner* — Brian Glessner
*Assistant Examiner* — James Buckle, Jr.
(74) *Attorney, Agent, or Firm* — CKC & Partners Co., Ltd.

(57) ABSTRACT

A mounting device is fastened over various types of standing seams of a roof. The mounting device includes a mounting body, a wedge-like core and two bolts. The mounting body includes a slot extending therethrough with a trapezoidal cross-section, a first tapped hole and a second tapped hole, wherein the slot has an opening at a relatively short side of a pair of parallel sides of the trapezoidal cross-section. The wedge-like core is sandwiched between a pair of nonparallel sides of the slot. A first bolt is screwed into the first tapped hole and has an end in contact with the wedge-like core for securing a standing seam. A second bolt is screwed into the second tapped hole for securing a desired object on the roof.

10 Claims, 8 Drawing Sheets

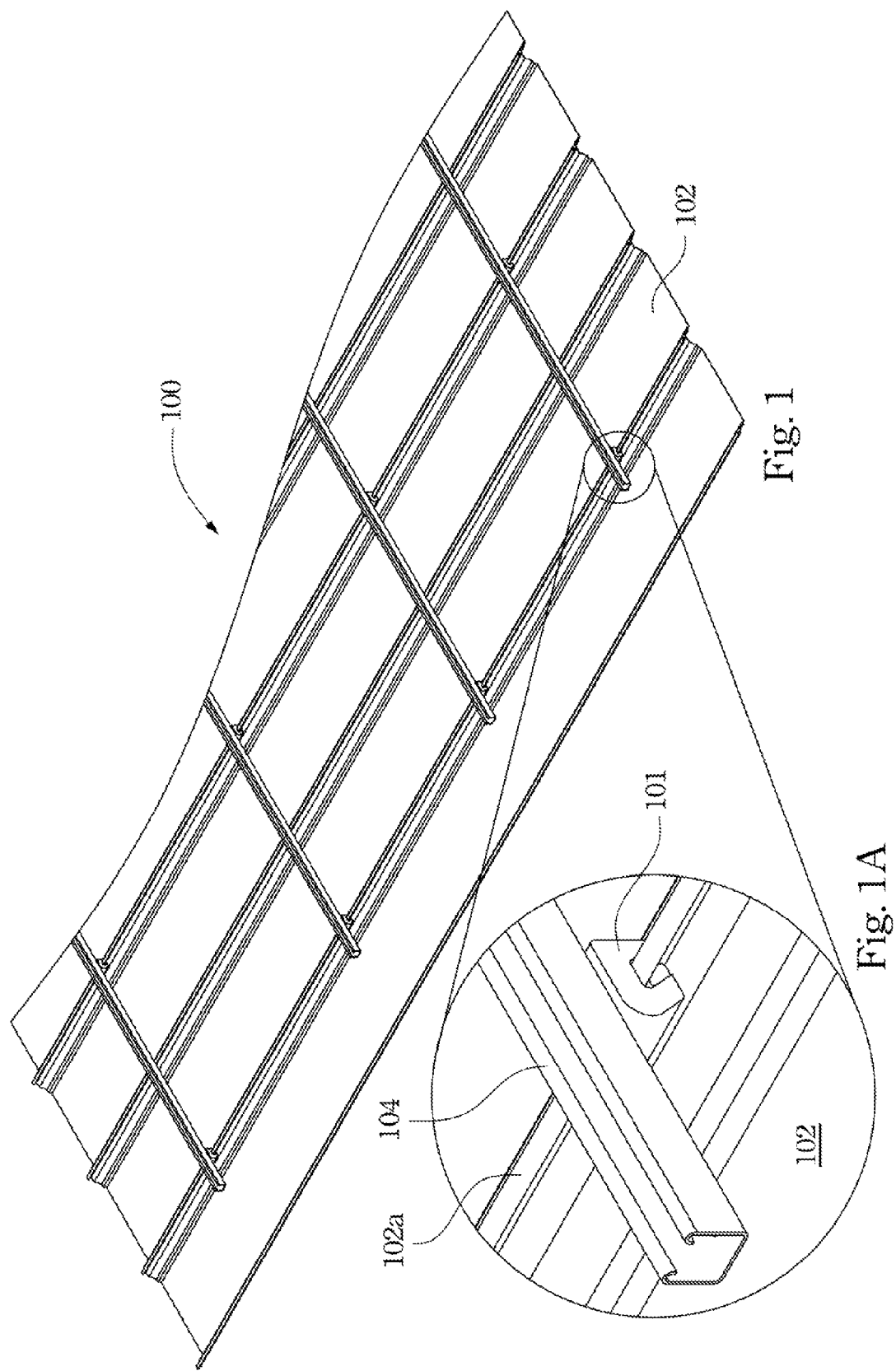

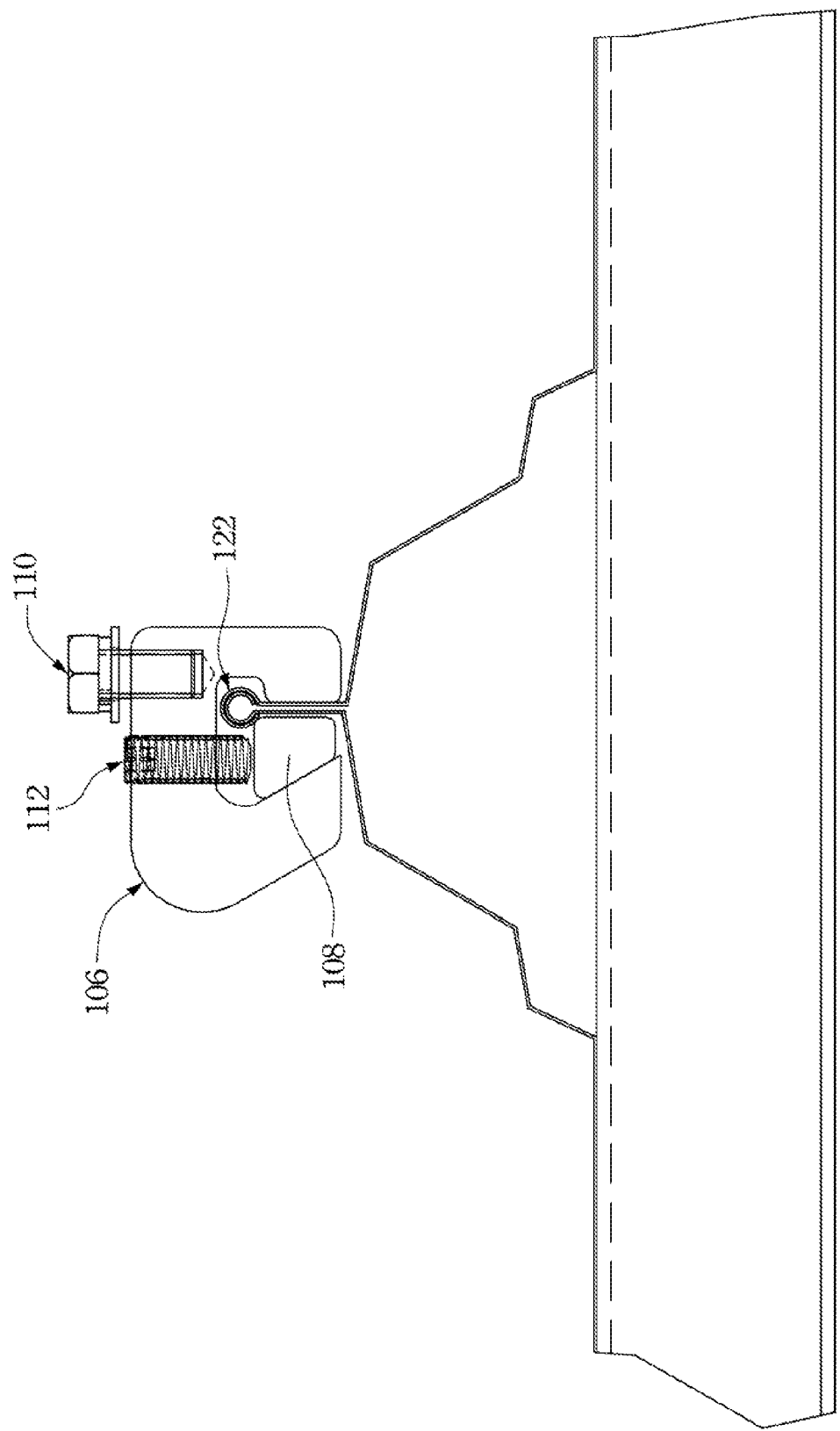

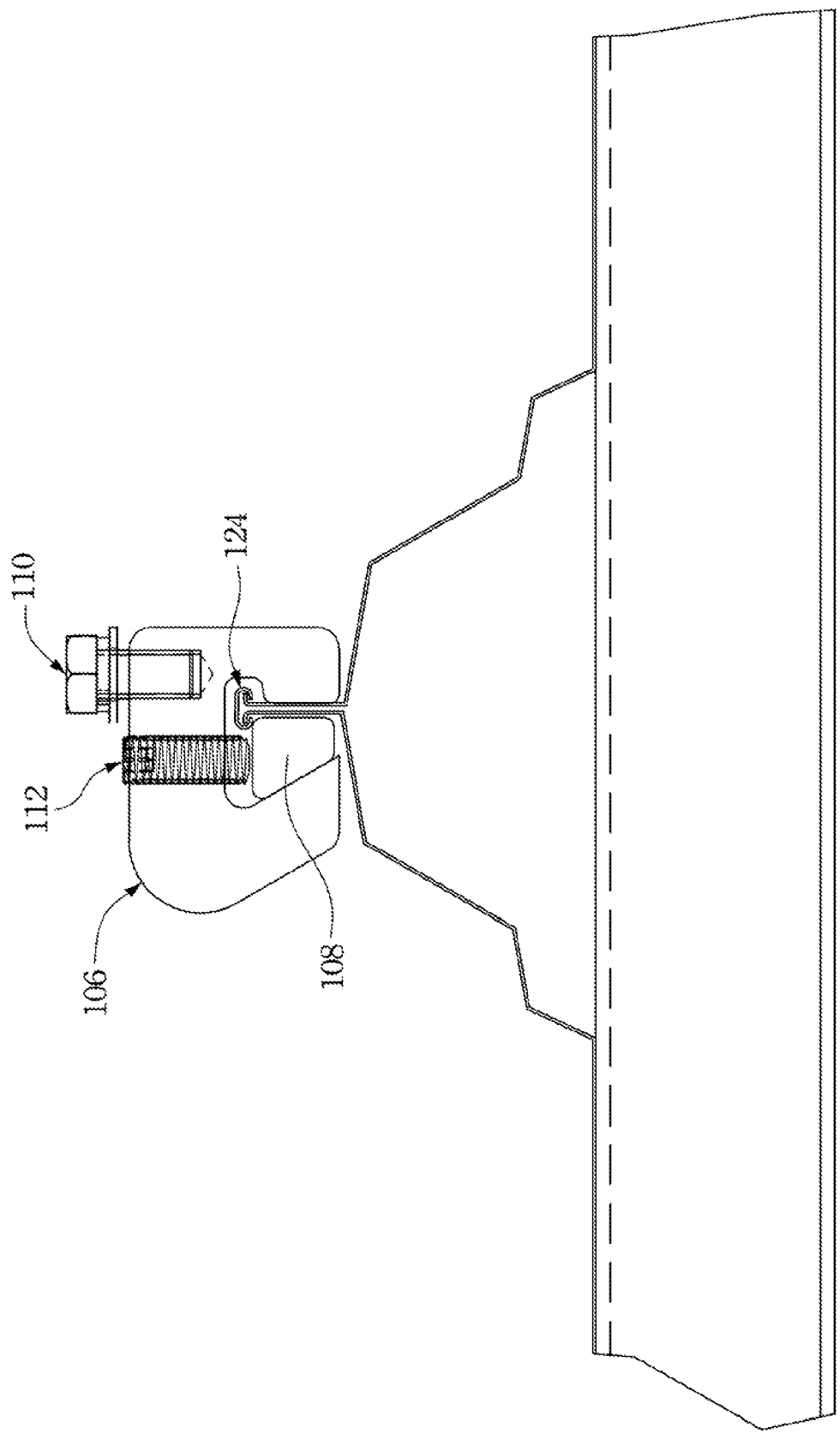

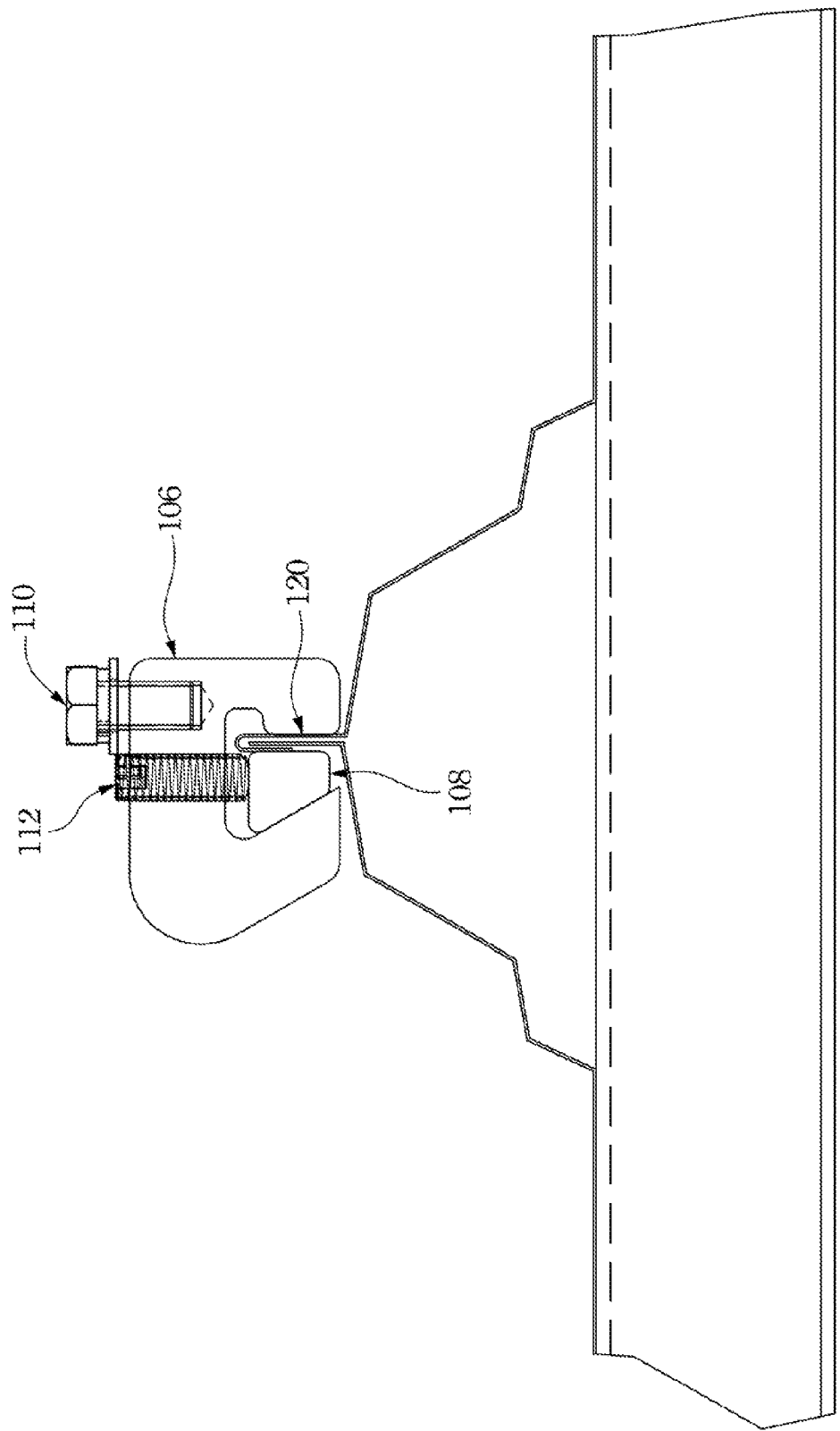

MOUNTING DEVICE AND ROOF CONNECTION DEVICE USING THE SAME

RELATED APPLICATIONS

This application claims priority to China Application Serial Number 201010146535.1, filed Apr. 9, 2010, which is herein incorporated by reference.

BACKGROUND

1. Field of Invention

The present invention relates to a mounting device and a roof connection device using the mounting device.

2. Description of Related Art

There are two common ways to mount apparatuses on the roof. The first way is to cut an opening on the metal roof and a support base is then fastened thereon by screwing through the opening. A water-proof sealing is performed over the opening. The disadvantage of this way is that the water-proof sealing will be decayed and ineffective in water-proof after a long-period of time.

The second way is to use S-5 mounting devices to mount apparatuses over a standing seam of the roof. S-5 series mounting devices includes five types of mounting devices to be respectively used upon the most popular five standing seams on the roof: O-shaped standing seam, T-shaped standing seam, L-shaped standing seam, Q-shaped standing seam and I-shaped standing seam. Although the metal roof needs not to be cut when using the S-5 series mounting devices, it is somewhat inconvenient to use a specified mounting device to fasten over a corresponding standing seam. For the forgoing reasons, there is a need for improving the roof mounting device.

SUMMARY

It is therefore an objective of the present invention to provide an improved roof-mounting device.

In accordance with the foregoing and other objectives of the present invention, a mounting device is provided to be fastened over various types of standing seams of a roof. The mounting device includes a mounting body, a wedge-like core and two bolts. The mounting body includes a slot extending therethrough with a trapezoidal cross-section, a first tapped hole and a second tapped hole, wherein the slot has an opening at a relatively short side of a pair of parallel sides of the trapezoidal cross-section. The wedge-like core is sandwiched between a pair of nonparallel sides of the slot. A first bolt is screwed into the first tapped hole and has an end in contact with the wedge-like core for securing a standing seam. A second bolt is screwed into the second tapped hole for securing a desired object on the roof.

According to an embodiment disclosed herein, the first bolt is a hexagon head bolt or a hexagon socket bolt.

According to another embodiment disclosed herein, the second bolt is a hexagon head bolt or a hexagon socket bolt.

According to another embodiment disclosed herein, the mounting body has a wedge-like cross-section.

In accordance with the foregoing and other objectives of the present invention, a roof connection device is provided to include a connection beam and a plurality of mounting devices for fastening the connection beam on a roof. Each of the mounting devices includes a mounting body, a wedge-like core and two bolts. The mounting body includes a slot extending therethrough with a trapezoidal cross-section, a first tapped hole and a second tapped hole, wherein the slot has an opening at a relatively short side of a pair of parallel sides of the trapezoidal cross-section. The wedge-like core is sandwiched between a pair of nonparallel sides of the slot. A first bolt is screwed into the first tapped hole and has an end in contact with the wedge-like core for securing a standing seam of the roof. A second bolt is screwed into the second tapped hole for securing the connection beam on the roof.

According to an embodiment disclosed herein, the first bolt is a hexagon head bolt or a hexagon socket bolt.

According to another embodiment disclosed herein, the second bolt is a hexagon head bolt or a hexagon socket bolt.

According to another embodiment disclosed herein, the mounting body has a wedge-like cross-section.

According to another embodiment disclosed herein, the mounting body is made from metal, plastics, ceramics, glass-reinforced plastics, bakelite, nylon or ebonite.

According to another embodiment disclosed herein, the wedge-like core is made from metal, plastics, ceramics, glass-reinforced plastics, bakelite, nylon or ebonite.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 illustrates a perspective view of a roof connection device according to one preferred embodiment of this invention;

FIG. 1A illustrates an enlarged perspective view of a mounting device as illustrated in FIG. 1;

FIG. 6 illustrates a cross-sectional view of a mounting device fastened over an O-shaped standing seam according to one preferred embodiment of this invention;

FIG. 7 illustrates a cross-sectional view of a mounting device fastened over a T-shaped standing seam according to another preferred embodiment of this invention;

FIG. 10 illustrates a cross-sectional view of a mounting device fastened over an I-shaped standing seam according to still another preferred embodiment of this invention.

DESCRIPTION OF THE PREFERRED EMBODIMENTS

Figure 3:
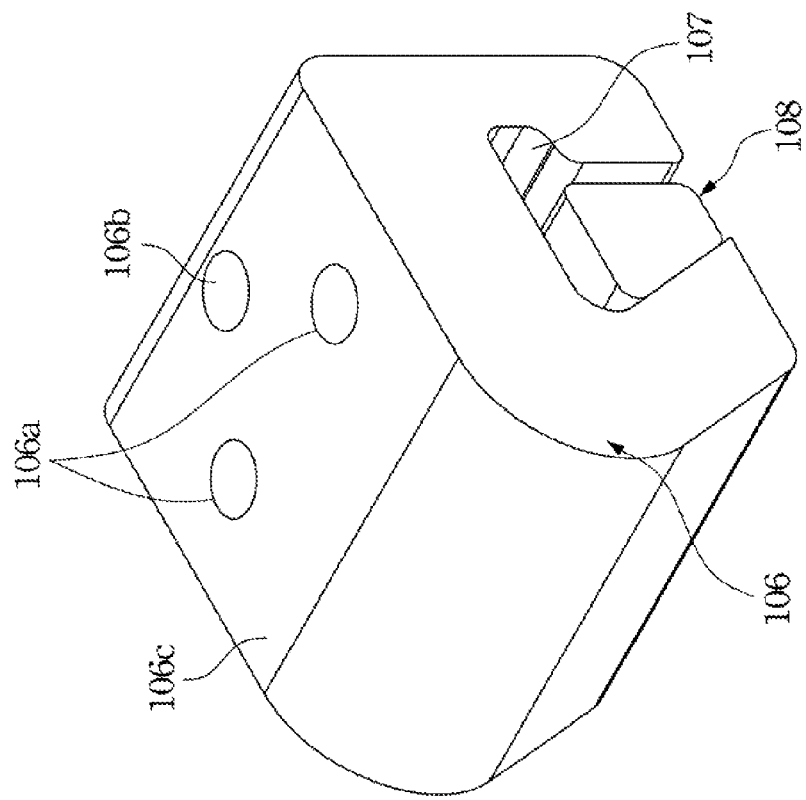
FIG. 3 illustrates the mounting device as illustrated in FIG. 2 with its bolts removed.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a perspective view of a roof connection device according to one preferred embodiment of this invention, wherein FIG. 1A illustrates an enlarged perspective view of a mounting device as illustrated in FIG. 1. The roof connection device 100 basically includes a connection beam 104 and a plurality of mounting devices 101. Each of the mounting devices 101 is fastened a standing seam 102a of the roof 102 at a side and fastened to a bottom of the connection beam 104 at an opposite side. That is, the connection beam 104 is secured to the roof 102 by means of a plurality of mounting devices 101. If apparatuses (such as solar panels or the like) are desired to be mounted on the roof 102, they can be secured on top of one or more connection beams 104. The connection beam 104 can be an elongated bar of any types of cross-sections, e.g. C-shaped cross-section, I-shaped cross-section, triangular cross-section or etc., and can be made from metal, glass-reinforced plastics or non-reinforced plastics. The mounting device 101 disclosed herein provides a relatively large friction and support for securing an apparatus over the standing seam 102a of the roof 102 compared with any conventional mounting device.

Figure 2:
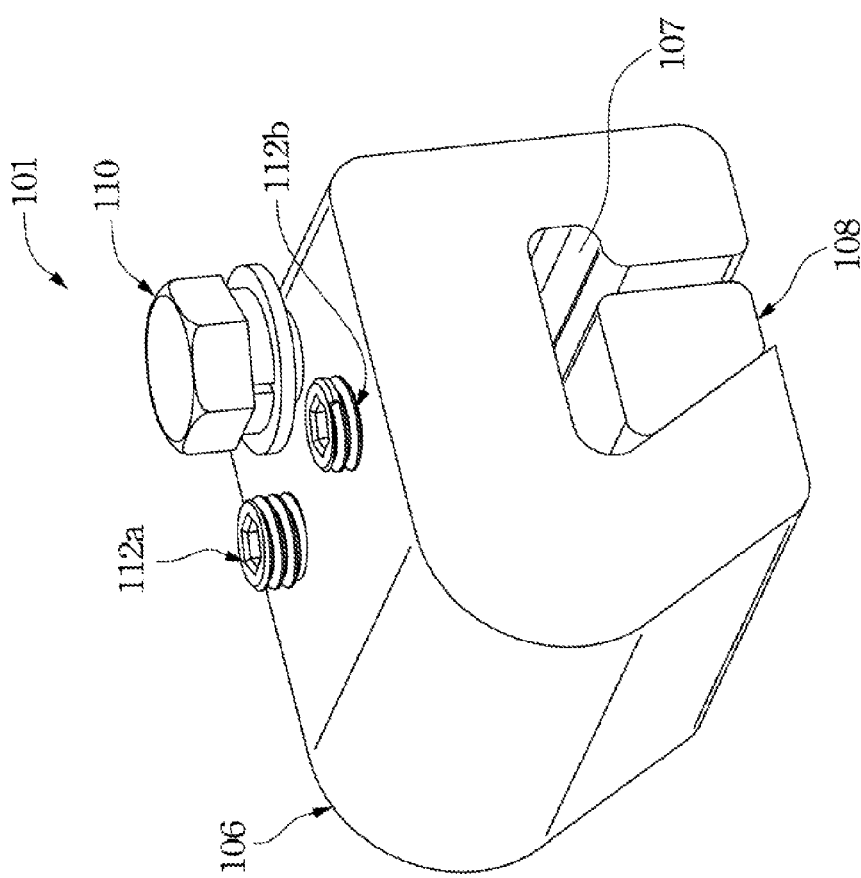
FIG. 2 illustrates a perspective view of a mounting device according to one preferred embodiment of this invention.

FIG. 2 illustrates a perspective view of a mounting device according to one preferred embodiment of this invention. FIG. 3 illustrates the mounting device as illustrated in FIG. 2 with its bolts removed. The mounting device 101 basically includes a mounting body 106 and a wedge-shaped or wedge-like core, such as a trapezoidal core 108 shown in FIG. 2, wherein the trapezoidal core 108 is positioned within a trapezoidal slot 107 (a slot with a trapezoidal cross-section) of the mounting body 106. A top surface 106c of the mounting body 106 includes two first tapped holes 106a and a second tapped hole 106b to be respectively screwed by bolts (112a, 112b, 110). A cross-section of the mounting body 106 includes but not limited to a trapezoidal, wedge-like or rectangular cross-section. In this embodiment, there are two first tapped holes 106a and one second tapped hole 106b, but the number of the first tapped hole 106a or second tapped hole 106b can be varied according to the demands (but each tapped hole requires at least one). The bolt (112a, 112b, 110) can be a hexagon head bolt (e.g. 110 as illustrated in FIG. 2), a hexagon socket bolt (e.g. 112a or 112b as illustrated in FIG. 2) or any type of bolt capable of being screwed into a tapped hole, and being chosen according to the demands. Both the mounting body 106 and core 108 can be made from metal, plastics, ceramics, glass-reinforced plastics, bakelite, nylon or ebonite. In this embodiment, the mounting body 106 and trapezoidal core 108 are both made from an extruded aluminum alloy. In an alternate embodiment, the mounting body 106 and trapezoidal core 108 can be made from other proper materials by a proper process.

Figure 5:
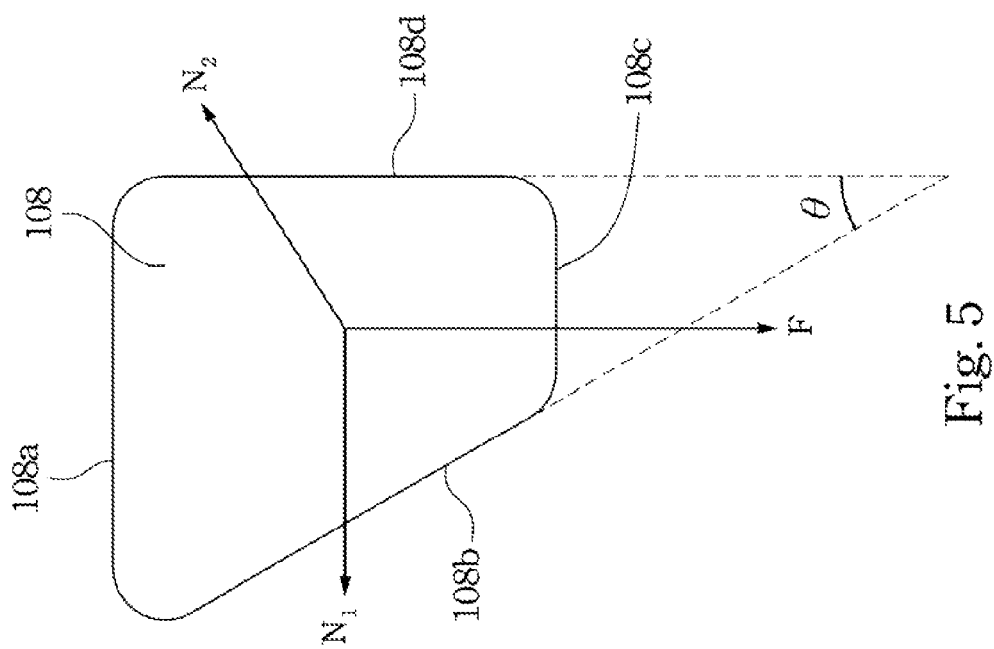
FIG. 5 illustrates a diagram to explain all applied forces upon a wedge-like core as illustrated in FIG. 4.
Figure 4:
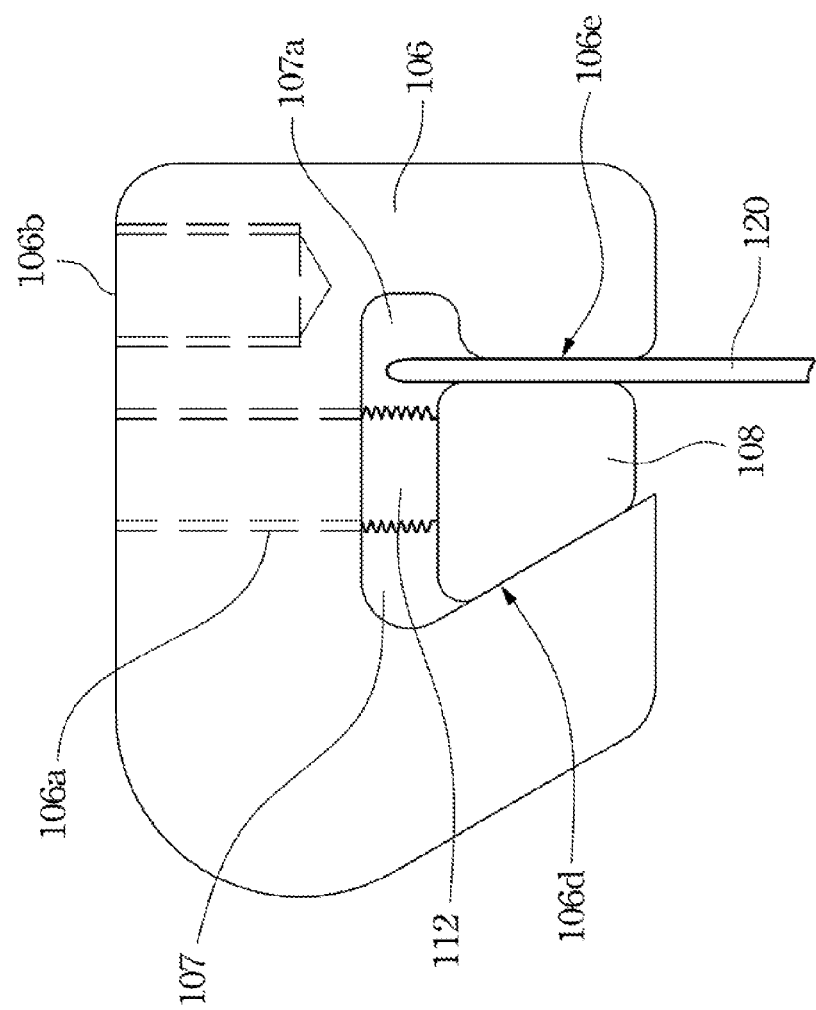
FIG. 4 illustrates a side view of a mounting device fastened over an I-shaped standing seam.

FIG. 4 illustrates a side view of a mounting device fastened over an I-shaped standing seam. FIG. 5 illustrates a diagram to explain all applied forces upon a trapezoidal core as illustrated in FIG. 4. When the mounting device 101 is fastened over a standing seam of a roof (e.g. a standing seam 120), the first bolt 112 is screwed through the first tapped hole 106a and in contact with a top surface of the trapezoidal core 108, thereby applying a force on the trapezoidal core 108. When the first bolt 112 applies a force on the trapezoidal core 108, a pair of nonparallel edges (108b, 108d) of the trapezoidal core 108 are sandwiched between a pair of nonparallel sides 106d and 106e (or inner surfaces) of the slot 107, thereby generating a higher holding force and thus a higher friction.

In most cases of a conventional mounting device, a bolt is screwed through a tapped hole and in direct contact with a standing seam. Therefore, "a force which the bolt applies upon the standing seam" equals to a "holding force" upon the standing seam.

For the mounting device 101 disclosed herein, "F" is the force which the bolt applies upon the trapezoidal core 108, a "counteraction force $N_2$" is thus increased due to the nonparallel side 106d (nonparallel with the side 106e), and a "holding force $N_1$" applied upon the standing seam 120 is also increased. The "holding force $N_1$" can be varied according to an included angle θ as illustrated in FIG. 5. Taking the included angle θ of 30° for example, the "holding force $N_1$", which the mounting device 101 applies upon the standing seam 120, equals to 1.73 F (F/tan 30°). Assuming the friction coefficient is the same both in the conventional mounting device and the mounting device 101, the friction (a holding force times a friction coefficient) of the mounting device 101 would increase 73% compared with the conventional mounting device.

Regarding the design of the slot 107, its lower opening is a relatively short side of a pair of parallel sides (an upper side of the slot 107 and the lower opening) of the trapezoidal cross-section. The lower opening of the slot 107 should be shorter than an upper edge 108a of the trapezoidal core 108 so as to prevent the trapezoidal core 108 from slipping out of the slot 107. The lower opening of the slot 107 may be slightly shorter or longer than a lower edge 108c of the trapezoidal core 108. The slot 107 has a trapezoid-like cross-section and an extra slot 107a such that the mounting device 101 can be fastened over various types of standing seams. The mounting device 101 can be fastened over the standing seams as follows, but not limited to the following standing seams.

FIG. 6 illustrates a cross-sectional view of a mounting device fastened over an O-shaped standing seam according to one preferred embodiment of this invention. In this embodiment, the bolt 112 is in direct contact with the trapezoidal core 108, thereby applying a holding force to two opposite sides of the O-shaped standing seam 122.

FIG. 7 illustrates a cross-sectional view of a mounting device fastened over a T-shaped standing seam according to another preferred embodiment of this invention. In this embodiment, the bolt 112 is in direct contact with the trapezoidal core 108, thereby applying a holding force to two opposite sides of the T-shaped standing seam 124.

Figure 8:
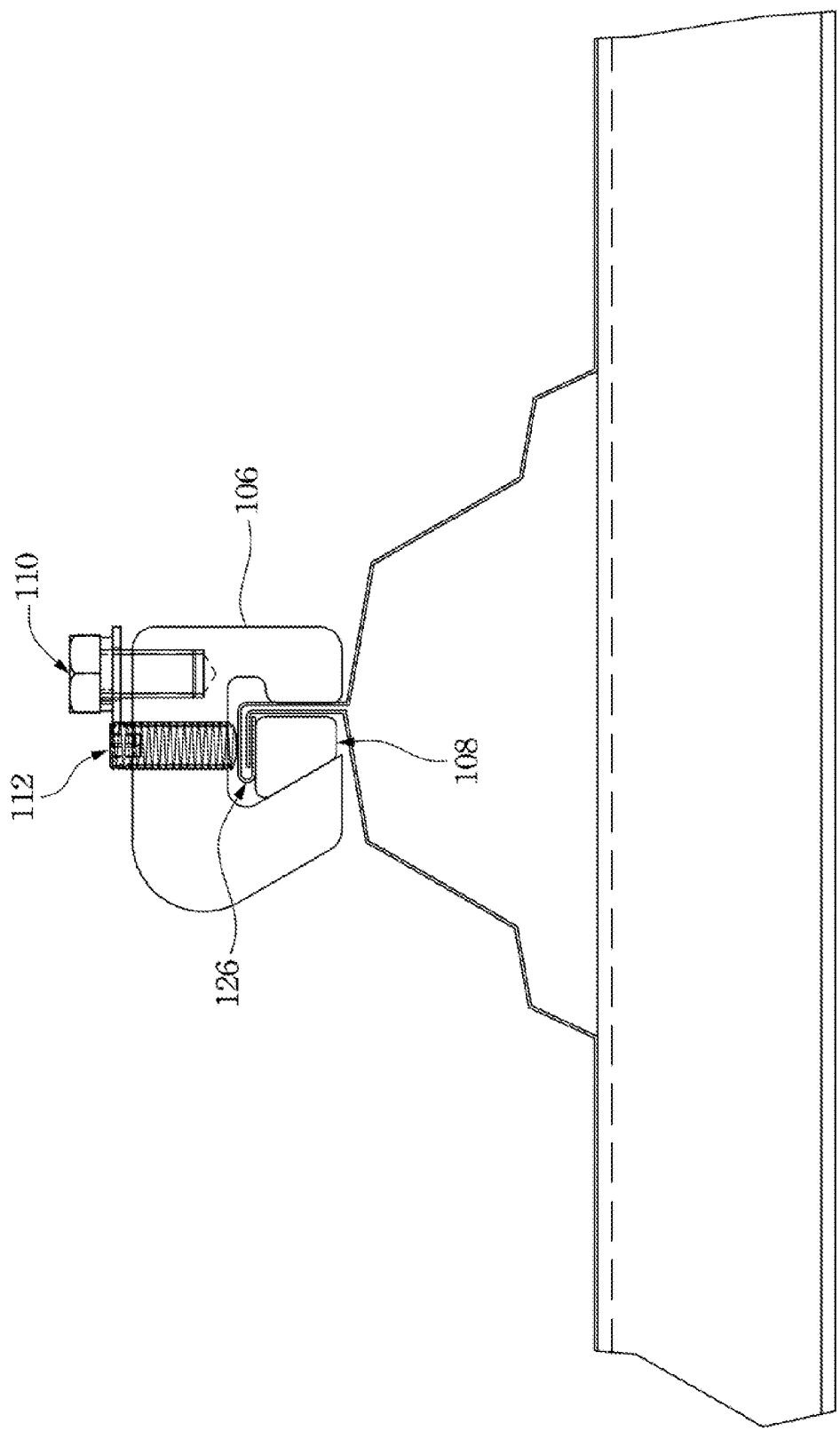
FIG. 8 illustrates a cross-sectional view of a mounting device fastened over an L-shaped standing seam according to another preferred embodiment of this invention.

FIG. 8 illustrates a cross-sectional view of a mounting device fastened over an L-shaped standing seam according to another preferred embodiment of this invention. In this embodiment, the bolt 112 is in direct contact with a horizontal part of the L-shaped standing seam 126, and applies a force to the trapezoidal core 108 indirectly, thereby applying a holding force to two opposite sides of a vertical part of the T-shaped standing seam 126.

Figure 9:
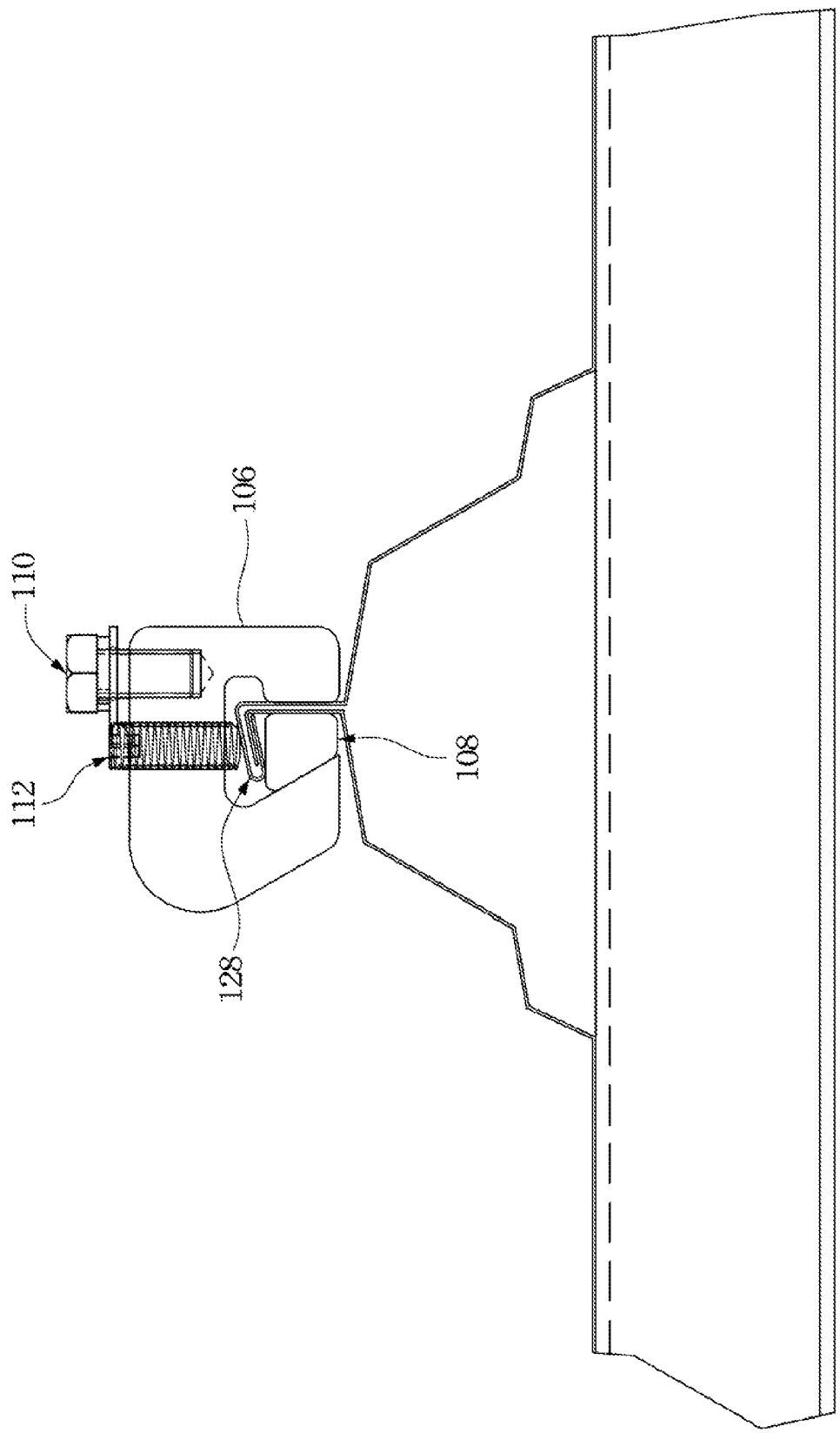
FIG. 9 illustrates a cross-sectional view of a mounting device fastened over a Q-shaped standing seam according to another preferred embodiment of this invention.

FIG. 9 illustrates a cross-sectional view of a mounting device fastened over a Q-shaped standing seam according to another preferred embodiment of this invention. In this embodiment, the bolt 112 is in direct contact with a top edge of the Q-shaped standing seam 128, and applies a force to the trapezoidal core 108 indirectly, thereby applying a holding force to two opposite sides of a vertical part of the Q-shaped standing seam 128.

FIG. 10 illustrates a cross-sectional view of a mounting device fastened over an I-shaped standing seam according to still another preferred embodiment of this invention. In this embodiment, the bolt 112 is in direct contact with the trapezoidal core 108, thereby applying a holding force to two opposite sides of the I-shaped standing seam 120.

According to the above-discussed embodiments, the mounting device and roof connection device disclosed herein can be used upon the most popular five standing seams on the roof. Because the mounting device is equipped with an enhanced holding force, each connection beam requires less mounting devices to achieve the same fastening force, thereby deducting the costs of mounting devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mounting device to be fastened over various types of standing seams of a roof, the mounting device comprising:
   a mounting body comprising a slot having a wedge-like cross-section extending therethrough, a first tapped hole and a second tapped hole, wherein the slot has an opening at a relatively short side of a pair of parallel sides of the wedge-like cross-section;
   a wedge-like core being sandwiched between a pair of nonparallel sides of the slot;
   a first bolt being screwed into the first tapped hole and has an end in contact with the wedge-like core for securing a standing seam; and
   a second bolt being screwed into the second tapped hole for securing an desired object on the roof.

2. The mounting device of claim 1, wherein the first bolt comprises a hexagon head bolt or a hexagon socket bolt.

3. The mounting device of claim 1, wherein the second bolt comprises a hexagon head bolt or a hexagon socket bolt.

4. The mounting device of claim 1, wherein the mounting body comprises a wedge-like cross-section.

5. A roof connection device comprising:
   a connection beam; and
   a plurality of mounting devices for fastening the connection beam on a roof, each of the mounting devices comprises:
   a mounting body comprising a slot having a wedge-like cross-section extending therethrough, a first tapped hole and a second tapped hole, wherein the slot has an opening at a relatively short side of a pair of parallel sides of the wedge-like cross-section;
   a wedge-like core being sandwiched between a pair of nonparallel sides of the slot;
   a first bolt being screwed into the first tapped hole and has an end in contact with the wedge-like core for securing a standing seam of the roof; and
   a second bolt being screwed into the second tapped hole for securing the connection beam on the roof.

6. The roof connection device of claim 5, wherein the first bolt comprises a hexagon head bolt or a hexagon socket bolt.

7. The roof connection device of claim 5, wherein the second bolt comprises a hexagon head bolt or a hexagon socket bolt.

8. The roof connection device of claim 5, wherein the mounting body comprises a wedge-like cross-section.

9. The roof connection device of claim 5, wherein the mounting body comprises metal, plastics, ceramics, glass-reinforced plastics, bakelite, nylon or ebonite.

10. The roof connection device of claim 5, wherein the wedge-like core comprises metal, plastics, ceramics, glass-reinforced plastics, bakelite, nylon or ebonite.

\* \* \* \* \*